June 13, 1950          D. L. CHIPPS          2,511,046
TRAILER AXLE AND SPRING SUSPENSION
Filed Dec. 30, 1948
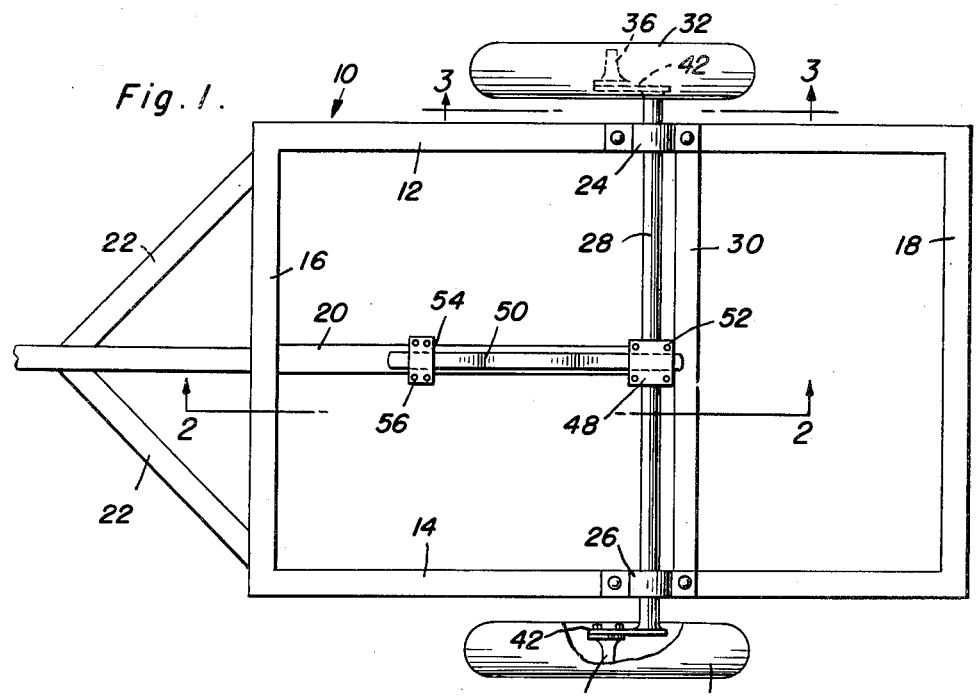
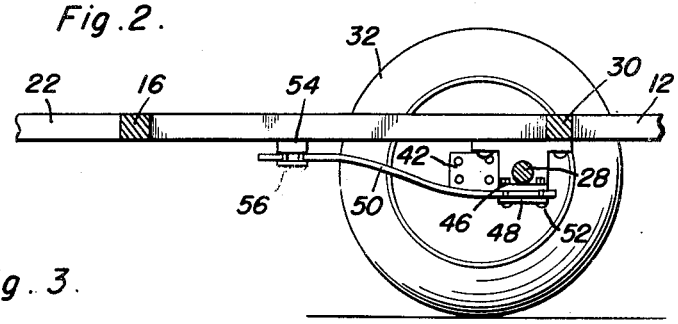
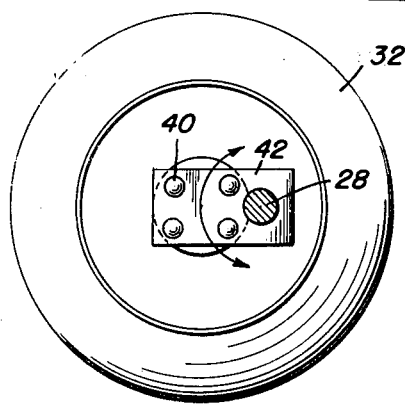
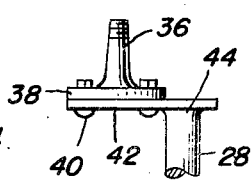
Inventor
Dale L. Chips
By *Clarence A. O'Brien and Harvey B. Jacobson*
Attorneys

UNITED STATES PATENT OFFICE 2,511,046

TRAILER AXLE AND SPRING SUSPENSION

Dale L. Chipps, Davis Dam, Nev.

Application December 30, 1948, Serial No. 68,311

1 Claim. (Cl. 267—19)

The present invention relates to spring suspension for motor vehicles and has for its primary object the provision of a spring and offset axle assembly for particular use on a trailer.

Yet another object of this invention is to provide a resilient mounting for trailers that will inhibit to the greatest extent practical the rocking of the body.

Yet another object of this invention is to provide in a wheeled trailer; a means for resiliently suspending the wheels comprising an axle rotatably journaled on the trailer, means for securing the ends of said axle to the wheels in an offset relation thereto, a spring, and means for terminally securing said spring to the trailer and to said axle intermediate the ends thereof.

These, together with various ancillary objects and features of the invention which will later become apparent as the following description proceeds, are attained by the device, a preferred embodiment of which has been illustrated by way of example only in the accompanying drawings, wherein:

Figure 1 is a bottom plan view of the trailer embodying the device of the instant invention;

Figure 2 is a longitudinal sectional view taken substantially on the plane of section line 2—2 of Figure 1;

Figure 3 is a sectional view taken substantially in the plane of section line 3—3 of Figure 1; and Figure 4 is a fragmentary top plan view illustrating the mounting of the trailer axle on the wheel hubs.

Specific reference is now made to the drawings. In the several views in the accompanying drawings and in the following specification reference characters indicate corresponding elements throughout.

Indicated generally at 10 is a trailer constructed preferably of side members 12 and 14 interconnected by means of front and end members 16 and 18 and having a central longitudinally extending bar 20 for attachment to a conventional trailer hitch (not shown). The bar 20 is further connected to the trailer frame by means of forwardly diverging braces 22.

Rotatably positioned in suitable bearings 24 and 26 and extending transversely of the trailer frame is an axle 28. Further extending transversely of the trailer and parallel to the axle is a bar 30 for receiving the free end of the longitudinally extending central bar 20. Wheels 32 and 34 are provided having stub axles 36 and a hub 38. Secured to the hub by means of bolts 40 are plates 42 adjacent the free ends of which are welded as at 44, the ends of the axle 28.

At a position intermediate the ends of the axle 28, the latter is welded to a plate 46 which is spaced from another plate 48. Intermediate the two plates 46 and 48 the extremity of a longitudinally extending angulated leaf spring 50 is retained by means of suitable clamping bolts 52. The other end of the leaf spring 50 is secured forwardly of the longitudinal bar 20 by means of a suitable shackle 54 having bolts 56 for retaining the spring 50 on the shackle.

Thus it will be seen that a novel and effective means for resiliently mounting or suspending the wheels on a trailer is provided which will be effective in carrying out the intended purposes of the invention.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claim.

Having described the invention, what is claimed as new is:

In a wheeled trailer; a means for resiliently suspending the wheels comprising an axle rotatably journalled on the trailer, means for securing the ends of said axle to the wheels in an offset relation thereto, a longitudinally extending leaf spring, and means for terminally securing said spring to the trailer and to said axle intermediate the ends thereof, said last-named means including a shackle securing one end of said spring to the trailer, a first plate welded to the underside of said axle, a second plate beneath said first plate, said spring extending between said plates, and means clamping said plates together.

DALE L. CHIPPS.

REFERENCES CITED

The following references are of record in the file of this patent:

UNITED STATES PATENTS

| Number | Name | Date |
| --- | --- | --- |
| 2,034,155 | Schell | Mar. 17, 1936 |
| 2,153,237 | Clark | Apr. 4, 1939 |
| 2,386,988 | Sullivan | Oct. 16, 1945 |
| 2,455,787 | Linn | Dec. 7, 1948 |

FOREIGN PATENTS

| Number | Country | Date |
| --- | --- | --- |
| 646,761 | Germany | June 21, 1937 |